United States Patent
Bhide et al.

(10) Patent No.: US 11,683,348 B2
(45) Date of Patent: Jun. 20, 2023

(54) BYPASSING SECURITY VULNERABLE AND ANOMALOUS DEVICES IN MULTI-DEVICE WORKFLOW

(71) Applicant: International Business Machines Corporation, Armonk, NY (US)

(72) Inventors: Manish Anand Bhide, Hyderabad (IN); Sarbajit K. Rakshit, Kolkata (IN); Madhavi Katari, Hyderabad (IN); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 16/925,960

(22) Filed: Jul. 10, 2020

(65) Prior Publication Data

US 2022/0014565 A1 Jan. 13, 2022

(51) Int. Cl.
*H04L 9/40* (2022.01)
*G06F 21/57* (2013.01)
*H04L 29/06* (2006.01)

(52) U.S. Cl.
CPC .......... *H04L 63/205* (2013.01); *G06F 21/577* (2013.01); *H04L 63/1433* (2013.01)

(58) Field of Classification Search
CPC . H04L 63/1433; H04L 63/20; H04L 63/1441; H04L 63/14; G06F 21/577; G06F 21/50; G06F 21/55; G06F 21/554
See application file for complete search history.

(56) References Cited

U.S. PATENT DOCUMENTS

| | | | |
|---|---|---|---|
| 6,195,760 | B1 | 2/2001 | Chung |
| 6,854,069 | B2 | 2/2005 | Kampe |
| 9,426,153 | B2 | 8/2016 | Kim |
| 10,171,586 | B2 | 1/2019 | Shaashua |

(Continued)

FOREIGN PATENT DOCUMENTS

| | | |
|---|---|---|
| JP | 3900194 B2 | 4/2007 |
| WO | 2019168032 A1 | 9/2019 |

OTHER PUBLICATIONS

"Top 10 Vulnerability Assessment Scanning Tools | Vulnerability Scanner", Mar. 16, 2018, 3 pages, <https://cwatch.comodo.com/blog/website-security/top-10-vulnerability-assessment-scanning-tools/>.

(Continued)

*Primary Examiner* — Edward Zee
(74) *Attorney, Agent, or Firm* — Stephanie L. Carusillo

(57) ABSTRACT

In an approach for bypassing security vulnerable and anomalous devices in a multi-device workflow, a processor monitors behavior and network traffic of a plurality of smart devices within a multi-smart device system. A processor identifies a first smart device of the plurality of smart devices with at least one of a security vulnerability and an anomaly. A processor identifies a multi-smart device workflow that includes the first smart device. A processor identifies a function of the first smart device within the multi-smart device workflow. A processor determines whether an alternative smart device can replace the first smart device within the multi-smart device workflow. Responsive to resolution of the at least one of the security vulnerability and the anomaly, a processor re-establishes the workflow with the first smart device.

20 Claims, 3 Drawing Sheets

(56) References Cited

U.S. PATENT DOCUMENTS

| | | |
|---|---|---|
| 10,425,245 B2 | 9/2019 | Hund |
| 2007/0174693 A1* | 7/2007 | Gerber ................. G06Q 10/06 714/100 |
| 2008/0313634 A1* | 12/2008 | Matsueda .............. G06Q 10/06 718/100 |
| 2010/0180345 A1* | 7/2010 | Manchala ............... G06F 21/10 726/26 |
| 2018/0091327 A1 | 3/2018 | McLaughlin |
| 2018/0284756 A1 | 10/2018 | Cella |

OTHER PUBLICATIONS

"Vulnerability database", Wikipedia, Last edited on Jan. 15, 2020, 5 pages, <https://en.wikipedia.org/wiki/Vulnerability_database>.

\* cited by examiner

BYPASSING SECURITY VULNERABLE AND ANOMALOUS DEVICES IN MULTI-DEVICE WORKFLOW

BACKGROUND

The present invention relates generally to the field of multi-device workflows, and more particularly to bypassing security vulnerable and anomalous devices in multi-device workflow.

Internet of Things (IoT) refers to the concept of extending internet connectivity beyond conventional computing platforms such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

The definition of IoT has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the IoT. In the consumer market, IoT technology is most synonymous with smart devices and products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

In smart homes, multiple smart devices can communicate with each other and perform a series of activities in a workflow. For example, upon a smartwatch identifying that its user is awake, a smart coffee machine turns on to start making the user's coffee. The multiple smart devices send signals between each other in order to synchronize and serialize their activities. The multiple smart devices communicate with each other while executing a workflow to share relevant data among the devices.

SUMMARY

Aspects of an embodiment of the present invention disclose a method, computer program product, and computer system for bypassing security vulnerable and anomalous devices in a multi-device workflow. A processor monitors behavior and network traffic of a plurality of smart devices within a multi-smart device system. A processor identifies a first smart device of the plurality of smart devices with at least one of a security vulnerability and an anomaly. A processor identifies a multi-smart device workflow that includes the first smart device. A processor identifies a function of the first smart device within the multi-smart device workflow. A processor determines whether an alternative smart device can replace the first smart device within the multi-smart device workflow. Responsive to resolution of the at least one of the security vulnerability and the anomaly, a processor re-establishes the workflow with the first smart device.

DETAILED DESCRIPTION

Figure 1:
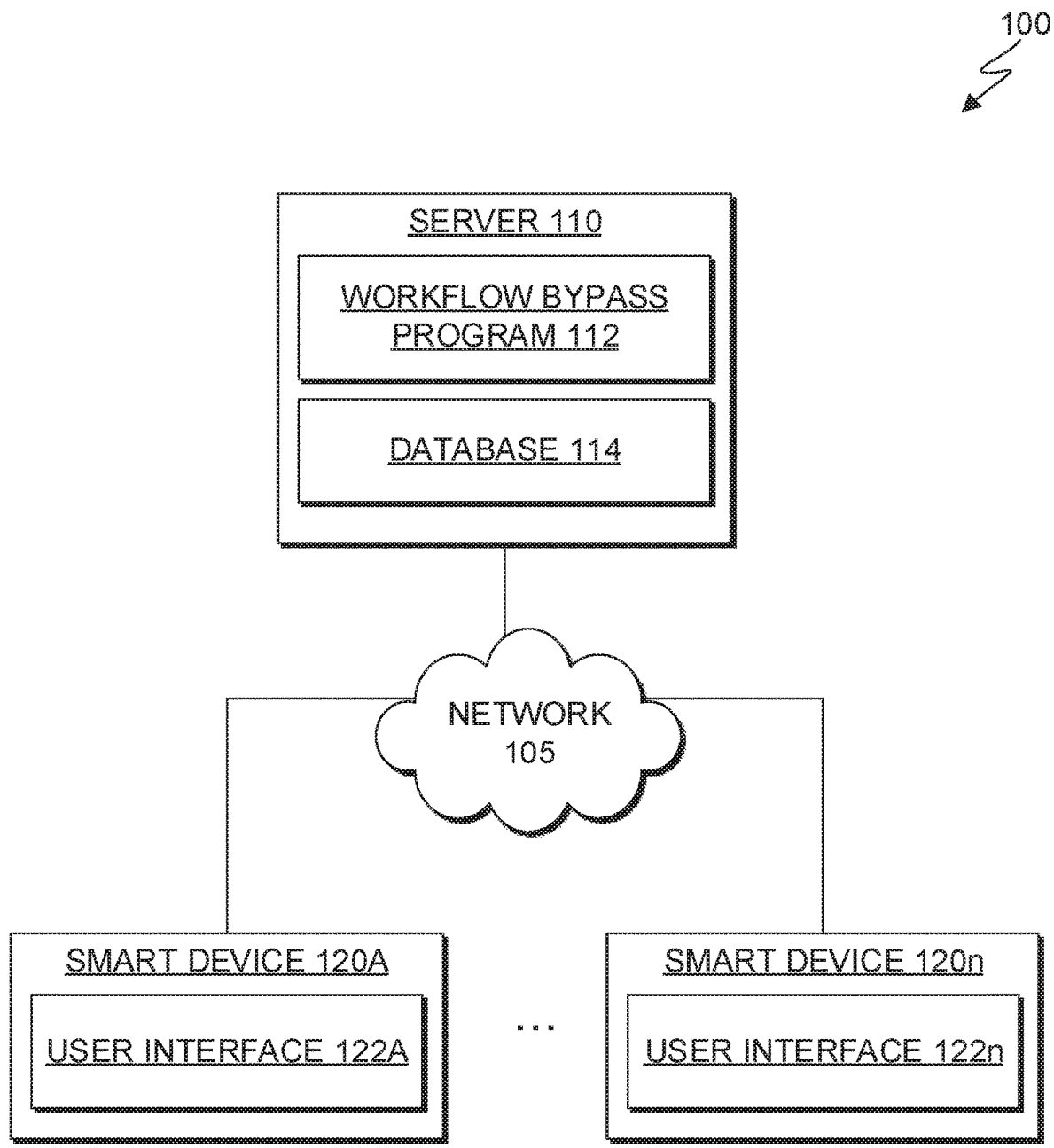
FIG. 1 depicts a block diagram of a distributed data processing environment, in accordance with an embodiment of the present invention.

Embodiments of the present invention recognize that smart devices in a multi-smart device system, i.e., smart home system, can communicate with each other and perform a series of activities in a workflow. A smart device is an electronic device, generally connected to other devices or networks via different wireless protocols, that can operate to some extent interactively and autonomously. For example, upon a smartwatch identifying that its user is awake, a smart coffee machine turns on to start making the user's coffee. The multiple smart devices send signals between each other in order to synchronize and serialize their activities. The multiple smart devices communicate with each other while executing a workflow to share relevant data among the smart devices. Embodiments of the present invention recognize that the initiation of a multi-smart device workflow can be triggered by an event-detection mechanism or a scheduled time mechanism.

Embodiments of the present invention further recognize that if one or more smart devices within a multi-smart device system has a security vulnerability, then a computer hacker could obtain personal information about one or more users through the one or more vulnerable devices. Additionally, if a feature of a smart device or the smart device itself has an anomaly, both operating errors and additional security vulnerabilities could occur. Embodiments of the present invention recognize the need for security vulnerable and anomalous devices to be bypassed in a multi-smart device workflow.

A security vulnerability can be determined by checking device function signatures, device compliance factors, checking for software patches, etc., and a device is insecure or vulnerable if something is lacking in any of these fronts. On the other hand, an anomaly occurs when a device does not function as expected. For example, a coffee maker no longer heats up the water. An anomaly can be a result of a functional failure (i.e., an electric coil burnout of the coffee maker) or a security vulnerability (i.e., a hacker hacked the coffee maker and undid either its coil heating initiation software process or rewrote the input-receiving interface sub-system of the coffee maker).

Embodiments of the present invention provide a system and method for identifying security vulnerable and/or anomalous devices based on different contextual situations and re-establishing a multi-smart device workflow by bypassing the identified devices. If one or more smart devices are identified as security vulnerable and/or anomalous devices, embodiments of the present invention will automatically stop device-to-device connectivity between the identified devices and the remaining devices in the multi-smart device system. Embodiments of the present invention notify the one or more users of the multi-smart device system to keep the identified devices out of near field communication (NFC) ranges and other near-field independent ad hoc communication networks so that the remaining devices are not affected.

If there are no alternative devices to execute one or more activities that would have been performed by the security vulnerable and anomalous devices that are bypassed in the workflow, embodiments of the present invention notify the one or more users of the multi-smart device system of the breaks in the workflow In some embodiments of the present invention, the system and method request a response from the one or more users of whether they want the workflow to resume.

The present invention may contain various accessible data sources, such as server 110 and smart devices 120A . . . n, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Workflow bypass program 112 enable the authorized and secure processing of personal data. Workflow bypass program 112 provide informed consent, with notice of the collection of personal data, allowing the user to opt in or opt out of processing personal data.

Consent by a user can take several forms. Opt-in consent can impose on the user to take an affirmative action before personal data is processed. Alternatively, opt-out consent can impose on the user to take an affirmative action to prevent the processing of personal data before personal data is processed. Workflow bypass program 112 provide information regarding personal data and the nature (e.g., type, scope, purpose, duration, etc.) of the processing. Workflow bypass program 112 provide the user with copies of stored personal data. Workflow bypass program 112 allow the correction or completion of incorrect or incomplete personal data. Workflow bypass program 112 allow the immediate deletion of personal data.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110 and smart devices 120A . . . n interconnected over network 105. In an embodiment, distributed data processing environment 100 represents a multi-smart device system, i.e., a smart home system, smart business system. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110 and smart devices 120A . . . n. Distributed data processing environment 100 may include additional servers, computers, or other devices not shown.

Server 110 operates to run workflow bypass program 112 and manage database 114. In the depicted embodiment, server 110 contains workflow bypass program 122 and database 114. In some embodiments, server 110 can be a standalone computing device, a management server, a web server, a mobile computing device, or any other electronic device or computing system capable of receiving, sending, and processing data. In some embodiments, server 110 may be a laptop computer, tablet computer, netbook computer, personal computer (PC), a desktop computer, a smart phone, or any programmable electronic device capable of communicating with smart devices 120A . . . n via network 105. In other embodiments, server 120 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 3.

Workflow bypass program 112 operates to identify security vulnerable and/or anomalous devices based on different contextual situations and re-establish a multi-smart device workflow by bypassing the identified devices. In the depicted embodiment, workflow bypass program 112 resides on server 110 with user interfaces 122A . . . n being the local app interfaces of workflow bypass program 112 on smart devices 120A . . . n. In other embodiments, workflow bypass program 112 may reside on another device (not shown) provided that workflow bypass program 112 has access to network 105. Workflow bypass program 112 is described in more detail below with reference to FIG. 2.

Database 114 operates as a repository for data received, used, and/or output by workflow bypass program 112. Data received, used, and/or generated may include, but is not limited to, a list of smart devices within a multi-smart device system, e.g., smart devices 120A . . . n, and a unique identification for each; information about each of the smart devices including capabilities of the device, what activities can be performed, etc.; data from monitoring behavior of devices within the multi-smart device system, including network traffic flowing in and out of the devices; historical usage patterns of devices by one or more users; workflows of the multi-smart device system, including workflows setup by one or more users and workflows created based on historical usage patterns of the smart devices; identified security vulnerable and/or anomalous devices; data input by one or more users through user interfaces on the smart devices, e.g., user interfaces 122A . . . n; and any other data received, used, and/or output by workflow bypass program 112. In an embodiment, database 114 includes a vulnerability database of known vulnerabilities, in which the known vulnerabilities come from crowdsourcing, as known to a person of skill in the art. In another embodiment, database 114 includes access to a vulnerability database as known to a person of skill in the art.

Database 114 can be implemented with any type of storage device capable of storing data and configuration files that can be accessed and utilized by server 110, such as a hard disk drive, a database server, or a flash memory. In an embodiment, database 114 is accessed by server 110, workflow bypass program 112, and/or smart devices 120A . . . n to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that database 114 has access to network 105.

Smart devices 120A . . . n, in which n equals any integer greater than 1, operate as physical devices and/or everyday objects that are embedded with electronics, Internet connectivity, and other forms of hardware (i.e., sensors). In general, smart devices can communicate and interact with other smart devices over the Internet while being remotely monitored and controlled. In the depicted embodiment, smart devices 120A . . . n are monitored and managed by workflow bypass program 112 on server 110 and/or one or more users through user interfaces 122A . . . n. Types of smart devices include, but are not limited to, smart locks, smart garage doors, smart refrigerators, smart ovens, smart watches, smart thermostats, smart coffee machines, smart washer/dryer units, smart TVs, mobile devices, virtual assistance devices, any other smart home devices, and any other smart business/corporate devices.

User interfaces 122A . . . n, in which n equals any integer greater than 1, each operate as a local user interface on smart devices 120A . . . n through which one or more users of smart devices 120A . . . n interact with smart devices 120A . . . n. In some embodiments, user interfaces 122A . . . n are a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from workflow bypass program 112 via network 105. In an embodiment, user interfaces 122A . . . n enable a user to send and receive data (i.e., to and from workflow bypass program 112 via network 105, respectively).

In an embodiment, user interfaces 122A . . . n display, present, or enable a user to set-up a workflow between a sub-set of smart devices 120A . . . n. In an embodiment, user interfaces 122A . . . n display, present, or enable a user to approve of a workflow created based on historical usage patterns of smart devices 120A . . . n. In an embodiment, user interfaces 122A . . . n display, present, or enable a user to receive notifications from workflow bypass program 112, e.g., notifying the user of an identified security vulnerable and/or anomalous device. In an embodiment, user interfaces 122A . . . n enable a user to enter information requested by workflow bypass program 112, e.g., asking the user to approve of an alternative smart device in a workflow.

Figure 2:
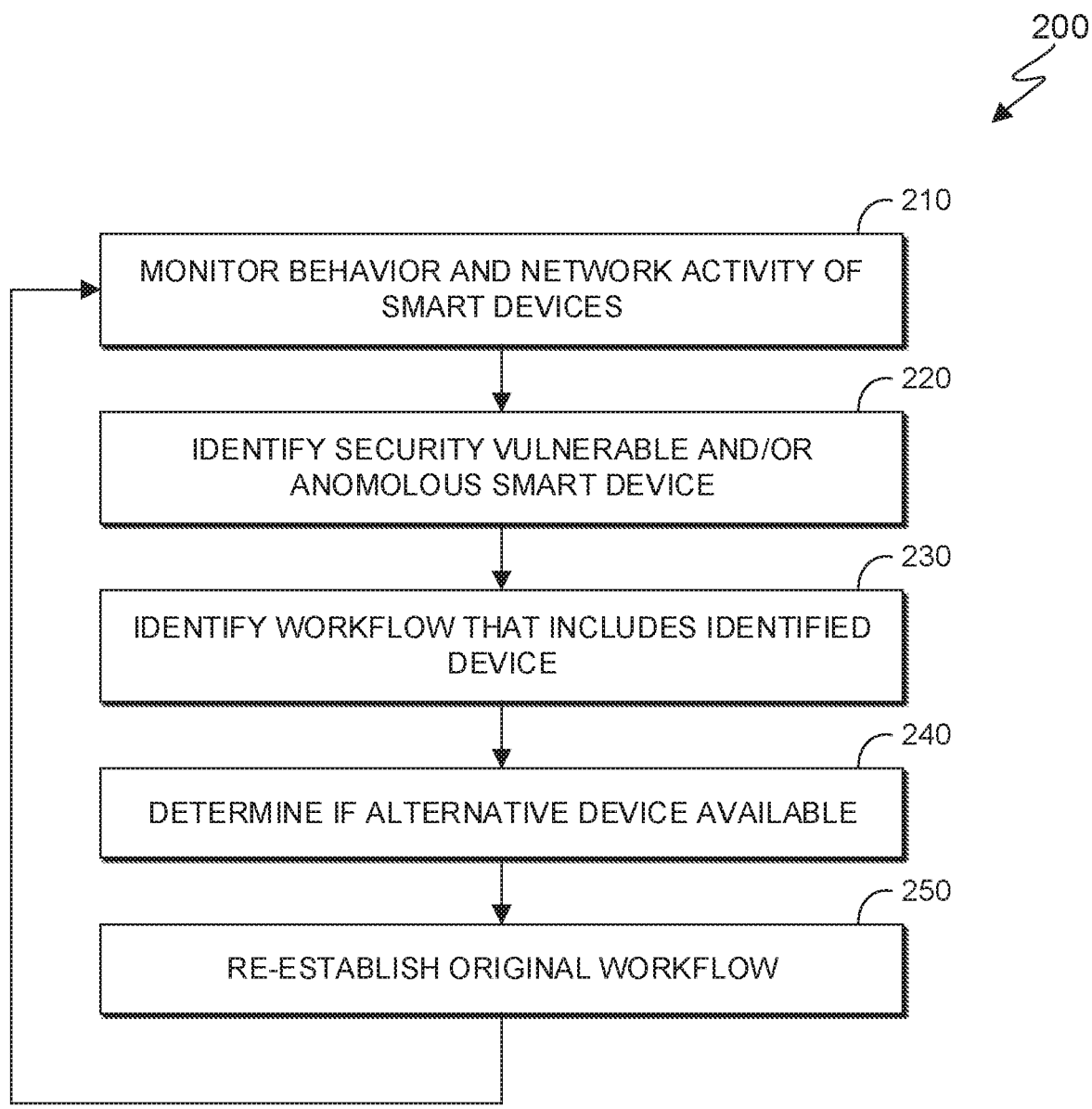
FIG. 2 depicts a flowchart of the steps of a workflow bypass program, in accordance with an embodiment of the present invention.

FIG. 2 depicts a flowchart 200 of the steps of workflow bypass program 112, in accordance with an embodiment of the present invention. In the depicted embodiment, workflow bypass program 112 monitors behaviors and network activity of a plurality of smart devices within a multi-smart device system, identifies security vulnerable and/or anomalous smart devices, removes the identified smart devices from a workflow, and re-establishes the workflow without the identified smart devices. It should be appreciated that the process depicted in FIG. 2 illustrates one possible iteration of workflow bypass program 112, which runs continuously to monitor and identify security vulnerable and/or anomalous smart devices within a multi-smart devices system.

In step 210, workflow bypass program 112 monitors behaviors and network activity of a plurality of smart devices within a multi-smart device system. In an embodiment, workflow bypass program 112 continuously monitors behaviors and network activity of smart devices 120A . . . n.

In an embodiment, workflow bypass program 112 stores behavior and network activity data to database 114. In an embodiment, workflow bypass program 112 monitors network traffic flowing into and out of smart devices 120A . . . n and, over time, creates a normal behavioral pattern of each of smart devices 120A . . . n. A normal behavioral pattern of a smart device includes, but is not limited to, pattern of communicating with other devices, position and activity in a known workflow, amount of time the smart device function lasts after a request, and an amount of time the smart device remains idle.

In an embodiment, workflow bypass program 112 continuously scans smart devices 120A . . . n for security vulnerabilities and anomalies based on (1) the vulnerability database of database 114 and (2) the normal behavioral patterns. In an embodiment, workflow bypass program 112 periodically scans smart devices 120A . . . n for security vulnerabilities and anomalies when the vulnerability database is updated and/or the normal behavioral patterns are updated with monitoring data in database 114. For example, workflow bypass program 112 monitors and see that the network traffic of smart device 120A is flowing outside of network 105 beyond a threshold time limit and/or outside the timing dictated by the normal behavioral pattern for smart device 120A.

In an embodiment, workflow bypass program 112 assesses smart devices 120A . . . n for security vulnerabilities and anomalies for different contextual situations. Different contextual situations would be the different actions that the same device is to take under different conditions. For example, if person A tends to drink coffee after waking up in the morning, then the coffee machine will turn on once a smart device associated with person A registers that person A has woken up. If person B does not drink coffee upon waking up in the morning, but after their evening walk, then the same coffee machine will not turn on when workflow bypass program 112 senses person B to be waking up; instead, the coffee machine will turn on when person B is near the end of their evening walk.

In step 220, workflow bypass program 112 identifies a security vulnerable and/or anomalous smart device. In an embodiment, workflow bypass program 112 identifies one of smart devices 120A . . . n as a security vulnerable and/or anomalous smart device based, at least in part, on the vulnerability database, the normal behavior pattern, and/or the contextual situation. In an embodiment, workflow bypass program 112 identifies one of smart devices 120A . . . n as a security vulnerable based, at least in part, on checking device function signatures, device compliance factors, checking for software patches, etc., and the smart device is insecure or vulnerable if something is lacking in one of these. In an embodiment, workflow bypass program 112 identifies one of smart devices 120A . . . n as an anomalous smart device based, at least in part, on a smart device not functioning as expected because of a functional failure or a security vulnerability.

In an embodiment, workflow bypass program 112 disconnects the identified device from the multi-smart device system. For example, smart device 120A is disconnected from network 105 so that it cannot be in direct communication with remaining smart devices 120B . . . n within distributed data processing environment 100. In an embodiment, workflow bypass program 112 sends a notification to one or more users of the identified device notifying them that the identified device should be kept beyond NFC and other near-field ad-hoc network ranges of the other devices within the multi-smart device system.

In step 230, workflow bypass program 112 identifies a workflow that includes the identified security vulnerable and/or anomalous smart device. In an embodiment, workflow bypass program 112 identifies at least one workflow that includes the identified security vulnerable and/or anomalous smart device. In an embodiment, workflow bypass program 112 identifies a workflow set-up by one or more users of the multi-smart device system that includes the identified security vulnerable and/or anomalous smart device. In another embodiment, workflow bypass program 112 identifies a workflow created based on device usage patterns that includes the identified security vulnerable and/or anomalous smart device. In an embodiment, workflow bypass program 112 removes the identified device from the workflow, so that the activity or function of the identified device does not perform automatically within the workflow.

In step 240, workflow bypass program 112 determines if there are one or more alternative devices to replace the identified security vulnerable and/or anomalous smart device within the workflow. In an embodiment, workflow bypass program 112 identifies the activity or function the identified device performed within the workflow. In an embodiment, workflow bypass program 112 determines if an alternative smart device can perform the activity or function of the removed device. In an embodiment, workflow bypass program 112 analyzes the volume of activity, time required to perform the activity, and capacity of alternative devices to determine if an alternative device within the multi-smart device system exists that can perform the activity or function in the workflow.

If workflow bypass program 112 determines an alternative smart device, workflow bypass program 112 re-establishes the workflow with the alternative smart device. In some embodiments, workflow bypass program 112 sends a notification to one or more users to approve of the alternative smart device in the workflow.

In an embodiment, if workflow bypass program 112 determines there is not an alternative smart device, workflow bypass program 112 notifies the one or more users that the function or activity of the identified security vulnerable and/or anomalous smart device will not occur automatically within the workflow and the one or more users must manually control the security vulnerable and/or anomalous device in a disconnected mode, i.e., disconnected from network 105. In an embodiment, if workflow bypass program 112 determines there is not an alternative smart device, workflow bypass program 112 bypasses the activity or function of the identified device and runs the workflow without that activity or function.

In step 250, workflow bypass program 112 re-establishes the original workflow. In an embodiment, responsive to resolution of the security vulnerability and/or anomaly of the identified device, workflow bypass program 112 re-establishes the original workflow. In an embodiment, workflow bypass program 112 re-establishes the identified device into the multi-smart device system and into the original workflow.

Figure 3:
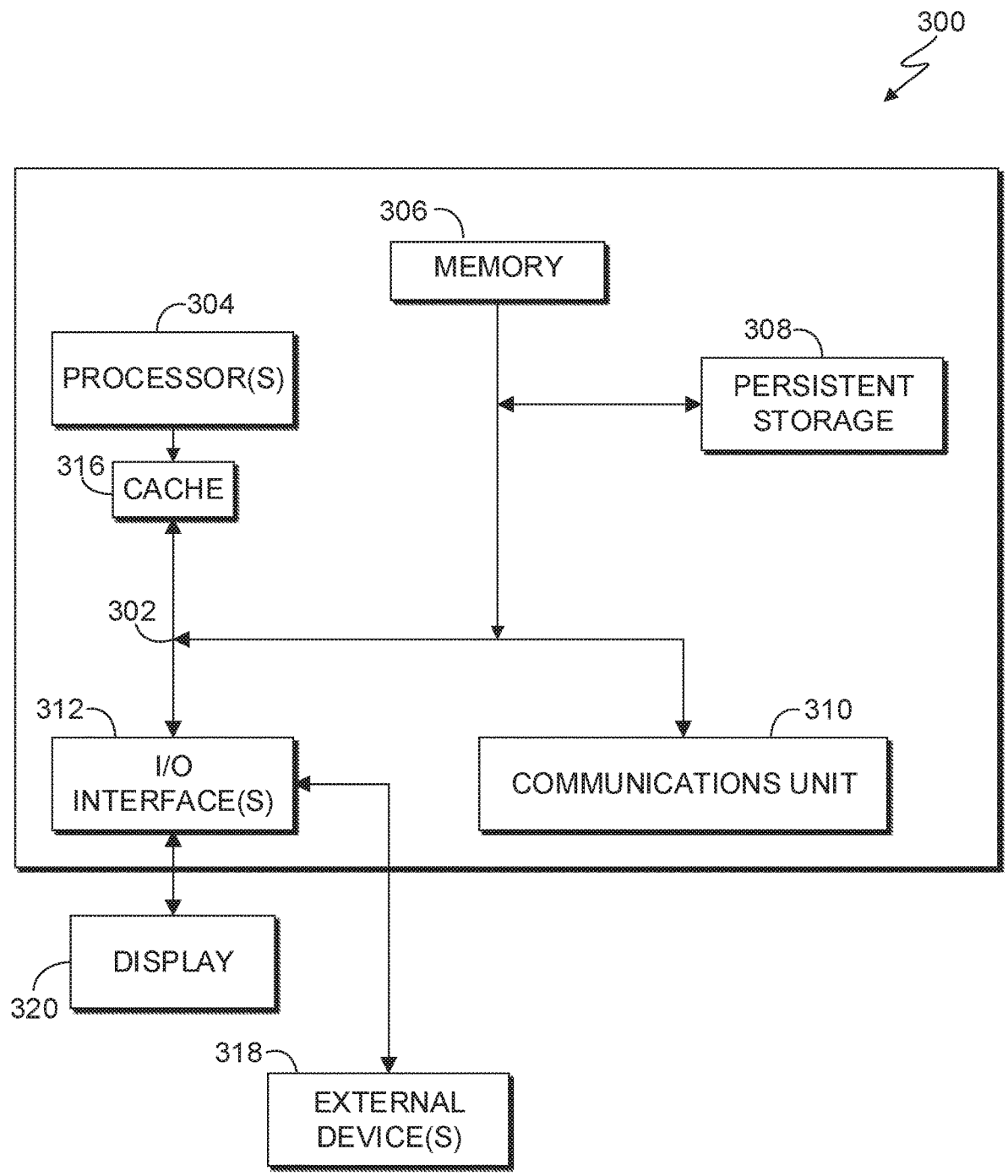
FIG. 3 depicts a block diagram of a computing device of the distributed data processing environment, in accordance with an embodiment of the present invention.

FIG. 3 depicts a block diagram of components of computing device 300 suitable for server 110 and/or smart devices 120A . . . n, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
monitoring, by one or more processors, behavior and network traffic of a plurality of smart devices within a multi-smart device system;
creating, by the one or more processors, a normal behavioral pattern for each smart device of the plurality of smart devices based on the behavior and network traffic;
scanning and accessing, by the one or more processors, the plurality of smart devices for known security vulnerabilities and anomalies for multiple contextual situations based on a known vulnerability database and the normal behavioral pattern of each smart device;
identifying, by the one or more processors, a first smart device of the plurality of smart devices with at least one of a security vulnerability and an anomaly;
identifying, by the one or more processors, a multi-smart device workflow that includes the first smart device;
identifying, by the one or more processors, a function of the first smart device within the multi-smart device workflow;
determining, by the one or more processors, whether an alternative smart device can perform the function and replace the first smart device with the alternative smart device within the multi-smart device workflow;
responsive to resolution of the at least one of the security vulnerability and the anomaly, re-establishing, by the one or more processors, the multi-smart device workflow with the first smart device.

2. The computer-implemented method of claim 1, wherein identifying the first smart device of the plurality of smart devices with at least one of the security vulnerability and the anomaly further comprises:
identifying, by the one or more processors, the first smart device has the anomaly based on the first smart device not functioning as expected because of a functional failure.

3. The computer-implemented method of claim 1, wherein identifying the first smart device of the plurality of smart devices with at least one of the security vulnerability and the anomaly further comprises:
identifying, by the one or more processors, the first smart device has the security vulnerability based on at least one of a vulnerability database, a normal behavior pattern, and a contextual situation.

4. The computer-implemented method of claim 1, further comprising:
responsive to determining the alternative smart device can perform the function and replace the first smart device within the multi-smart device workflow, replacing, by the one or more processors, the first smart device with the alternative smart device in the multi-smart device workflow; and
sending, by the one or more processors, a notification to one or more users of the multi-smart device system to approve of the alternative smart device in the multi-smart device workflow.

5. The computer-implemented method of claim 1, further comprising:
responsive to determining the alternative smart device cannot perform the function and replace the first smart device within the multi-smart device workflow, sending, by the one or more processors, a notification to one or more users of the multi-smart device system that the function of the first smart device will not occur automatically within the multi-smart device workflow and the one or more users must manually control the first smart device disconnected from the multi-smart device system.

6. The computer-implemented method of claim 1, further comprising:
responsive to determining the alternative smart device cannot perform the function and replace the first smart device within the multi-smart device workflow, bypassing, by the one or more processors, the function of the first smart device within the multi-smart device workflow.

7. The computer-implemented method of claim 1, further comprising:
sending, by the one or more processors, a notification to one or more users of the multi-smart device system, wherein the notification includes the at least one of the security vulnerability and the anomaly.

8. A computer program product comprising:
one or more computer readable storage media and program instructions stored on the one or more computer readable storage media, the program instructions comprising:
program instructions to monitor behavior and network traffic of a plurality of smart devices within a multi-smart device system;
program instructions to create a normal behavioral pattern for each smart device of the plurality of smart devices based on the behavior and network traffic;
program instructions to scan and access the plurality of smart devices for known security vulnerabilities and anomalies for multiple contextual situations based on a known vulnerability database and the normal behavioral pattern of each smart device;
program instructions to identify a first smart device of the plurality of smart devices with at least one of a security vulnerability and an anomaly;
program instructions to identify a multi-smart device workflow that includes the first smart device;
program instructions to identify a function of the first smart device within the multi-smart device workflow;
program instructions to determine whether an alternative smart device can perform the function and replace the first smart device with the alternative smart device within the multi-smart device workflow;
responsive to resolution of the at least one of the security vulnerability and the anomaly, program instructions to re-establish the multi-smart device workflow with the first smart device.

9. The computer program product of claim 8, wherein the program instructions to identify the first smart device of the plurality of smart devices with at least one of the security vulnerability and the anomaly further comprise:
program instructions to identify the first smart device has the anomaly based on the first smart device not functioning as expected because of a functional failure.

10. The computer program product of claim 8, wherein the program instructions to identify the first smart device of the plurality of smart devices with at least one of the security vulnerability and the anomaly further comprises:

program instructions to identify the first smart device has the security vulnerability based on at least one of a vulnerability database, a normal behavior pattern, and a contextual situation.

11. The computer program product of claim 8, further comprising:
responsive to determining the alternative smart device can perform the function and replace the first smart device within the multi-smart device workflow, program instructions to replace the first smart device with the alternative smart device in the multi-smart device workflow; and
program instructions to send a notification to one or more users of the multi-smart device system to approve of the alternative smart device in the multi-smart device workflow.

12. The computer program product of claim 8, further comprising:
responsive to determining the alternative smart device cannot perform the function and replace the first smart device within the multi-smart device workflow, program instructions to send a notification to one or more users of the multi-smart device system that the function of the first smart device will not occur automatically within the multi-smart device workflow and the one or more users must manually control the first smart device disconnected from the multi-smart device system.

13. The computer program product of claim 8, further comprising:
responsive to determining the alternative smart device cannot perform the function and replace the first smart device within the multi-smart device workflow, program instructions to bypass the function of the first smart device within the multi-smart device workflow.

14. The computer program product of claim 8, further comprising:
program instructions to send a notification to one or more users of the multi-smart device system, wherein the notification includes the at least one of the security vulnerability and the anomaly.

15. A computer system comprising:
one or more computer processors;
one or more computer readable storage media;
program instructions stored on the computer readable storage media for execution by at least one of the one or more processors, the program instructions comprising:
program instructions to monitor behavior and network traffic of a plurality of smart devices within a multi-smart device system;
program instructions to create a normal behavioral pattern for each smart device of the plurality of smart devices based on the behavior and network traffic;
program instructions to scan and access the plurality of smart devices for known security vulnerabilities and anomalies for multiple contextual situations based on a known vulnerability database and the normal behavioral pattern of each smart device;
program instructions to identify a first smart device of the plurality of smart devices with at least one of a security vulnerability and an anomaly;
program instructions to identify a multi-smart device workflow that includes the first smart device;
program instructions to identify a function of the first smart device within the multi-smart device workflow;
program instructions to determine whether an alternative smart device can perform the function and replace the first smart device with the alternative smart device within the multi-smart device workflow;
responsive to resolution of the at least one of the security vulnerability and the anomaly, program instructions to re-establish the multi-smart device workflow with the first smart device.

16. The computer system of claim 15, wherein the program instructions to identify the first smart device of the plurality of smart devices with at least one of the security vulnerability and the anomaly further comprise:
program instructions to identify the first smart device has the anomaly based on the first smart device not functioning as expected because of a functional failure.

17. The computer system of claim 15, wherein the program instructions to identify the first smart device of the plurality of smart devices with at least one of the security vulnerability and the anomaly further comprises:
program instructions to identify the first smart device has the security vulnerability based on at least one of a vulnerability database, a normal behavior pattern, and a contextual situation.

18. The computer system of claim 15, further comprising:
responsive to determining the alternative smart device can perform the function and replace the first smart device within the multi-smart device workflow, program instructions to replace the first smart device with the alternative smart device in the multi-smart device workflow; and
program instructions to send a notification to one or more users of the multi-smart device system to approve of the alternative smart device in the multi-smart device workflow.

19. The computer system of claim 15, further comprising:
responsive to determining the alternative smart device cannot perform the function and replace the first smart device within the multi-smart device workflow, program instructions to send a notification to one or more users of the multi-smart device system that the function of the first smart device will not occur automatically within the multi-smart device workflow and the one or more users must manually control the first smart device disconnected from the multi-smart device system.

20. The computer system of claim 15, further comprising:
responsive to determining the alternative smart device cannot perform the function and replace the first smart device within the multi-smart device workflow, program instructions to bypass the function of the first smart device within the multi-smart device workflow.

* * * * *